US00RE36368E

United States Patent [19]

Johnson et al.

[11] E Patent Number: Re. 36,368

[45] Reissued Date of Patent: Nov. 2, 1999

[54] AUTOMATIC INTERACTIVE TELEVISION TERMINAL CONFIGURATION

[75] Inventors: Lee R. Johnson, Lawrenceville; Elizabeth A. Smith, Cumming, both of Ga.; Howard L. Myers, Columbia, Mo.

[73] Assignee: Scientific-Atlanta, Inc., Norcross, Ga.

[21] Appl. No.: 08/007,288

[22] Filed: Jan. 21, 1993

Related U.S. Patent Documents

Reissue of:

[64] Patent No.: 4,987,486
Issued: Jan. 22, 1991
Appl. No.: 07/289,218
Filed: Dec. 23, 1988

[51] Int. Cl.[6] ..... H04N 7/14

[52] U.S. Cl. ..... 348/10; 348/12; 455/5.1; 364/DIG. 2

[58] Field of Search ..... 358/86, 139; 455/4.2, 455/5.1; 348/1, 6–8, 10, 12

[56] References Cited

U.S. PATENT DOCUMENTS

| | | |
|---|---|---|
| 3,894,176 | 7/1975 | Mellon . |
| 3,968,327 | 7/1976 | Gregg, III . |
| 4,012,583 | 3/1977 | Kramer . |
| 4,031,543 | 6/1977 | Holz . |
| 4,072,825 | 2/1978 | McLay et al. . |
| 4,203,130 | 5/1980 | Doumit et al. . |
| 4,319,277 | 3/1982 | Nicholson et al. . |
| 4,403,303 | 9/1983 | Howes et al. . |
| 4,414,621 | 11/1983 | Bown et al. . |
| 4,425,579 | 1/1984 | Merrell . |
| 4,439,784 | 3/1984 | Furukawa et al. . |
| 4,451,895 | 5/1984 | Sliwkowski . |
| 4,486,779 | 12/1984 | Marti . |
| 4,510,568 | 4/1985 | Kishi et al. . |
| 4,536,791 | 8/1985 | Campbell et al. . |
| 4,538,174 | 8/1985 | Gargini et al. . |
| 4,575,579 | 3/1986 | Simon et al. . |

(List continued on next page.)

FOREIGN PATENT DOCUMENTS

| | | |
|---|---|---|
| 0 103 438 A1 | 3/1984 | European Pat. Off. . |
| 1 536 534 | 12/1978 | United Kingdom . |
| 2 062 422 | 5/1981 | United Kingdom . |
| 2 063 027 | 5/1981 | United Kingdom . |

OTHER PUBLICATIONS

DBC/MarketWatch[SM] Services Installation Guide by Data Broadcasting Corporation, Published 1986.

Model 8551–555, Model 8551–535 Subscriber Options Transmitter User's Manual by Scientific–Atlanta, Jul. 1987.

User's Guide Model 8525 Set–Top Terminal, undated.

Jerrold Infra Red Converter Programmer Model IR–PROG, undated.

Mitsubishi, TV Screen Character and Pattern Display Controller, undated.

*Primary Examiner*—Wing F. Chan
*Attorney, Agent, or Firm*—Banner & Witcoff Ltd.; Kenneth M. Massaroni

[57] ABSTRACT

A two-way interactive addressable entertainment terminal comprises a processor, a keyboard, a character generator responsive to the processor and memory for storage of an algorithm related to the installation of the terminal and to providing a verification indication at the terminal of acknowledged entry of the terminal into an entertainment system. The character generator, responsive to the passage of a predetermined period of time since the application of power to the terminal, causes a number of screens to be displayed on an associated television receiver. The display screens reinforce the algorithm and provide indications of programmed key functions despite labels of keys on the keyboard. Consequently, a user or installer is capable of installing a terminal according to the present invention without any communication with personnel at the location of a system manager. By requiring the practically simultaneous occurrence of two events the application of power and the actuation of a predetermined key, inadvertent entry into either an installation mode or a maintenance mode of terminal operation is prevented.

60 Claims, 7 Drawing Sheets

U.S. PATENT DOCUMENTS

| | | | |
|---|---|---|---|
| 4,586,035 | 4/1986 | Baker et al. . | |
| 4,586,158 | 4/1986 | Brandle . | |
| 4,677,467 | 6/1987 | Hayes | 358/86 |
| 4,700,378 | 10/1987 | Brown . | |
| 4,706,121 | 11/1987 | Young . | |
| 4,718,107 | 1/1988 | Hayes . | |
| 4,755,883 | 7/1988 | Uehira | 358/335 |
| 4,760,597 | 7/1988 | Hayes et al. | 358/86 |
| 4,771,456 | 9/1988 | Martin et al. | 348/11 |
| 4,786,967 | 11/1988 | Smith, III et al. . | |
| 4,792,972 | 12/1988 | Cook, Jr. . | |
| 4,814,972 | 3/1989 | Winter et al. . | |

FIG. 3(a)

```
* * * * * * * * * * * * * * * * * * *
*   SCREEN ALIGNMENT                *
*          - KEYS -                 *
*  [ CH+ ]     UP                   *
*  [ CH- ]     DOWN                 *
*  [ VOL+ ]    RIGHT                *
*  [ VOL- ]    LEFT                 *
*  [ BUY ]     SAVE                 *
*  [ NO ]      NEXT                 *
* * * * * * * * * * * * * * * * * * *
```

302

301

FIG. 3(b)

```
ROOM NAME:  0000001
ID NUMBER:   123ABC0
AC OUTLET:  SWITCHED
INTERLACE:  ON

[ OK ]    TOGGLE OUTLET
[ CH+ ]   TOGGLE INTERLACE
[ BUY ]   SAVE
[ NO ]    NEXT
```

FIG. 3(c)

```
* * * * * * * * * * * * * * * * * * *
*                                   *
*   - SYSMGR STATUS -               *
*        POLLING                    *
*                                   *
*   - CSSTT STATUS -                *
*     ACKNOWLEDGED                  *
*                                   *
*   ANY KEY TO QUIT                 *
* * * * * * * * * * * * * * * * * * *
```

© SCIENTIFIC-ATLANTA, 1988

FIG. 3(d)

```
MEMORY DUMP -HEX
4000- 0000031FFFFFFFFF
4008- 000000F690040000
4010- 00013600B4717100
4018- 00000000FFFF02FF
4020- 80A02020202041EF
4028- 570CF801BD406F00
4030- DE107D00E4209E00
4038- 027F00FF10FE00FB
PRESS [ CH+ ] OR [ CH- ]
```

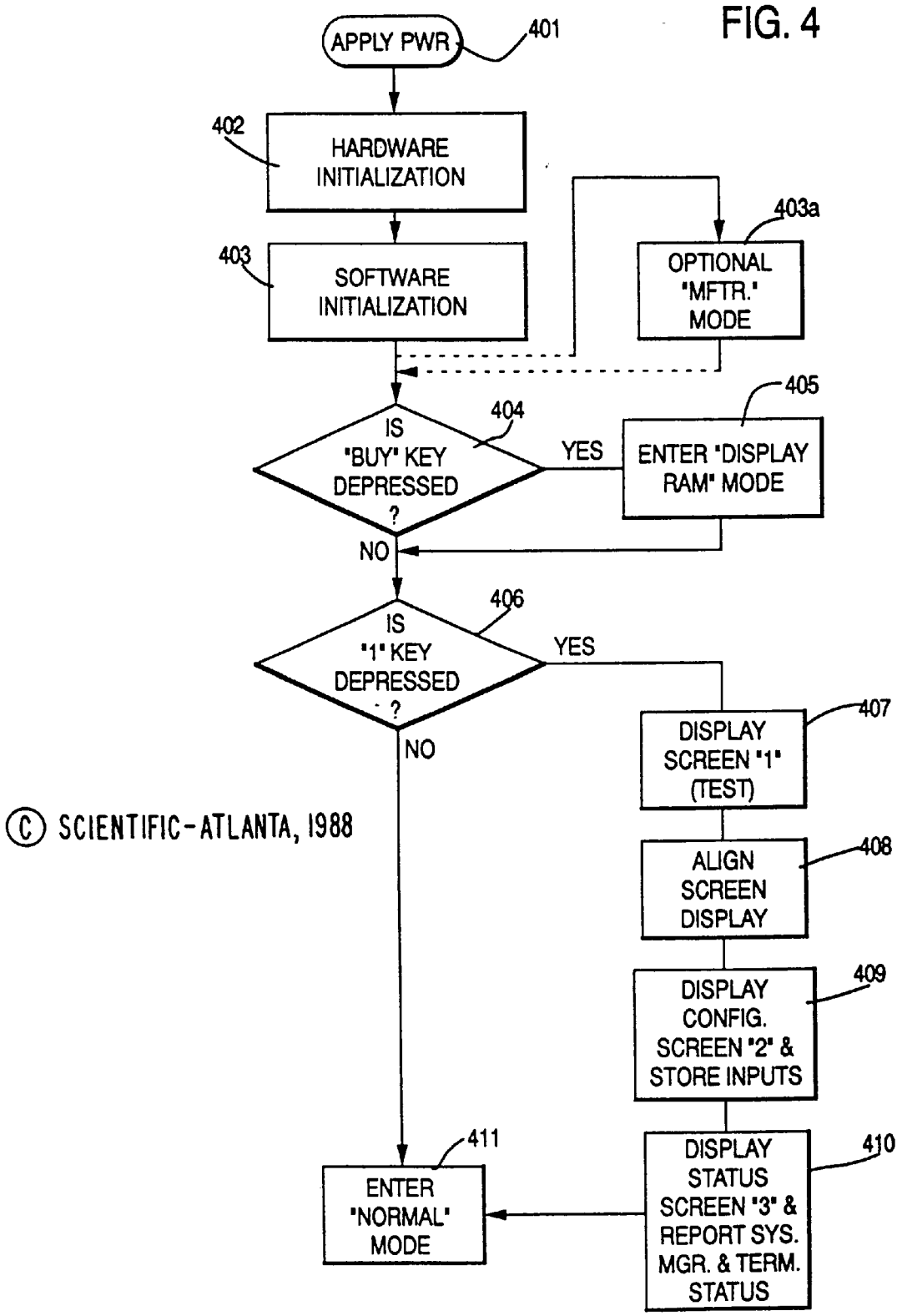
© SCIENTIFIC-ATLANTA, 1988

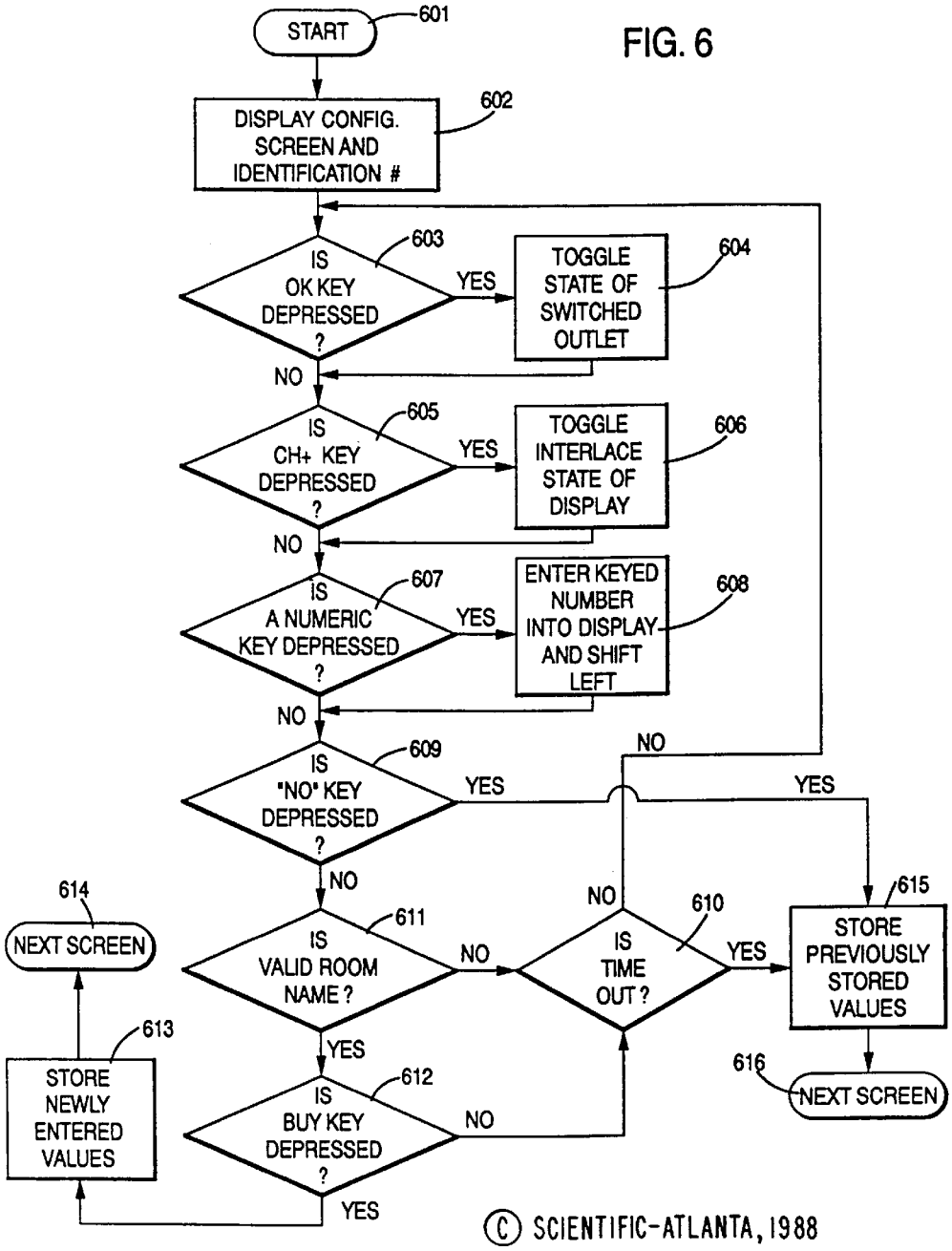
START
601
FIG. 6
DISPLAY CONFIG. SCREEN AND IDENTIFICATION #
602
IS OK KEY DEPRESSED ?
603
YES
TOGGLE STATE OF SWITCHED OUTLET
604
NO
IS CH+ KEY DEPRESSED ?
605
YES
TOGGLE INTERLACE STATE OF DISPLAY
606
NO
IS A NUMERIC KEY DEPRESSED ?
607
YES
ENTER KEYED NUMBER INTO DISPLAY AND SHIFT LEFT
608
NO
IS "NO" KEY DEPRESSED ?
609
YES
NO
YES
NO
IS VALID ROOM NAME ?
611
NO
IS TIME OUT ?
610
NO
YES
STORE PREVIOUSLY STORED VALUES
615
NEXT SCREEN
616
YES
IS BUY KEY DEPRESSED ?
612
NO
YES
STORE NEWLY ENTERED VALUES
613
NEXT SCREEN
614
© SCIENTIFIC-ATLANTA, 1988

© SCIENTIFIC-ATLANTA, 1988

AUTOMATIC INTERACTIVE TELEVISION TERMINAL CONFIGURATION

Matter enclosed in heavy brackets [ ] appears in the original patent but forms no part of this reissue specification; matter printed in italics indicates the additions made by reissue.

BACKGROUND OF THE INVENTION

1. Technical Field

This invention primarily relates to the field of two way interactive entertainment systems typically provided over cable facilities to a user and, more particularly, to a method and apparatus enabling automatic configuration of a television terminal and of its association with a television receiver.

2. Description of the Relevant Art

Two way interactive cable television systems are known for transmitting entertainment, information and data signals over a cable facility toward a plurality of users. Data may be transmitted and addressed to a particular subscriber over a separate data channel or a so-called "in-band" data channel. In a downstream direction, addressed control data may represent services authorized to a particular terminal or control commands to that terminal. In an upstream direction from a terminal to the service provider or system manager location, control data may represent selections made by a user in response to a polling request or at the time of user selection.

Terminals are often manufactured with stored unique identification numbers which may be unknown to a user for security purposes. Nevertheless, the unique identification number is necessary for the system manager to enter a terminal into a system along with location related information and configuration information. When service is ordered, an installer may be dispatched to an installation location with a terminal but, in the past, has not been able to align a screen display of an associated television receiver without having to obtain access to the interior of the terminal. Further, the installer has not been able to actuate entry of the terminal into the entertainment system without the assistance of personnel at the system manager location. Further still, the installer has been unable to immediately and automatically verify entry of the terminal into the system.

In a hotel/hospital environment, considerable interaction between an installer and the system manager location may be required to accomplish terminal configuration. In fact, the installer may be required to travel between the locations of the terminal and of the system manager until terminal entry into the system is acknowledged.

No provision has been made in the past for the possibility that a user may purchase their own terminal and configure the terminal themselves. The user is dependent on installer installation processes.

The installer or user, then, to configure a terminal should be able to assure themselves that the individual components of the terminal are functioning properly. They should assure themselves that any software is handling tasks in a responsible, efficient manner. The association of the terminal with the terminal receiver should be verified in at least two ways. Firstly, each television receiver may react differently to commands to display a teletext screen of information. Consequently, there may be a requirement to align the display of a test screen on the television receiver. Secondly, the turning off of power to a television receiver may be inappropriate for a particular television receiver installation.

Consequently, if power is supplied to the television receiver via the terminal, it may be appropriate to set a switched power outlet of the terminal to either a permanently ON or to a switched condition in which power is provided to the receiver only when the terminal is turned on. System entry is determined by, at least, the acceptance by a system manager of the unique terminal identification and, possibly, a secondary identification of the terminal and/or the user. Typically, a separate telephone communication is required for the user or installer to verify system entry.

Interactive terminals generally have been equipped without the capability of locally generating a display on an associated television receiver. Terminal-provided displays such as liquid crystal display of a selected channel number at a terminal are inadequate for providing an effective man/machine interface for accomplishing a complicated task such as terminal configuration. Supplementing any such display with an installation manual may still be inadequate and confuse the user or installer.

Keys normally provided at interactive terminals comprise a complement of numeric input keys, channel increment keys, volume control keys, a power button and a "buy" key. However, these keys are inappropriately labeled and may confuse the user if simultaneously employed for terminal configuration.

It is also known in the art of non-interactive cable television terminals having a programmable read only memory to enable a remote programming of the terminal via inputting a special code not provided with the standard remote control transmitter associated with the terminal. According to U.S. Pat. No. 4,792,972, which issued Dec. 20, 1988, entitled "Remote Programming of a CATV Channel Authorization Unit" and incorporated herein by reference, an installer employs a special programming unit equipped with, for example, an infrared transmitter to remotely program the read only memory of a so-called "plain Jane" converter, which is not addressable over a communication link by a system manager, nor is the converter capable of return transmissions. Via the special code, access is obtained to the read only memory into which memory is loaded premium channels and services authorization data. The converter is not equipped with a character generator and has so capability to locally generate character screens for display on an associated television receiver. All activities are controlled from the special code transmitting remote programming unit.

Consequently, there remains a requirement in the art for providing an interactive television terminal and method of enabling an automatic installation of the terminal comprising, for example, screen alignment, terminal configuration, or the acknowledgement of entry into an interactive entertainment system.

SUMMARY OF THE INVENTION

It is an object of the present invention to provide an interactive terminal capable of automatic configuration.

It is a further object of the present invention to provide an automatically configurable terminal that is user friendly.

It is a still further object of the present invention to provide an automatically configurable, user friendly terminal which guides the user through the steps of screen alignment, terminal configuration and system entry verification.

The problems and related deficiencies of prior art interactive entertainment terminals are solved by the principles underlying a terminal according to the present invention comprising a processor, associated memory for storing an algorithm related to initial terminal installation, a character generator responsive to processor control, a keypad or remote control for inputting information to the processor for processing and a power supply input. Once power is applied to the terminal, the processor enters an initialization mode in which proper operation of terminal components and software algorithms is verified. During initialization and within a predetermined period of time since power application, if a certain key is actuated, the microprocessor enters an installation mode of operation. During the installation mode of operation, the character generator responsive to processor control generates at least one character screen on a display of an associated television receiver. The character screen is stored in permanent memory of the terminal and is not dependent on system manager transmission of screen contents to the terminal for storage. The screen may relate to screen alignment, terminal configuration or system manager or terminal status.

Screen alignment relates to the problem that a particular television receiver may behave differently dependent on the format of a teletext screen presented to the receiver for display. Consequently, a test screen may be aligned according to the present invention by actuating keys identified on the display up or down and to the right or left. These are functions unrelated to the labels of the keys. However, by displaying the functions on the displayed test screen for alignment, a user or installer is encouraged to actuate them despite their labeling. Consequently, screen alignment is made user friendly.

In a similar manner, terminal features may be configured by a second screen and terminal location related information such as user or location specific data may be entered. Terminal features may include, for example, the interlaced or non-interlaced character of the display or the status of a switched power outlet of the terminal.

A system manager will globally call for responses periodically from previously unconfigured terminals. A third screen may provide an indication to the user of system manager status as well as whether the system manager has acknowledged entry of a previously unconfigured terminal into the system.

These and other features of the present invention will become evident from the following detailed description of the drawings.

BRIEF DESCRIPTION OF THE DRAWINGS

FIG. 3 is a collection of four exemplary screens, three of which according to FIG. 3(a), (b) and (c) are for display on a television receiver associated with the terminal of FIG. 2 during an automatic installation mode of operation of the terminal and the fourth, according to FIG. 3(d), is for display during a terminal maintenance mode.

FIG. 4 is a flowchart of an algorithm of terminal software for accomplishing an automatic installation mode of operation or similarly implemented manufacturing or maintenance modes of operation.

FIG. 6 is a detailed flowchart of processor operation related to terminal configuration.

DETAILED DESCRIPTION

Figure 1:
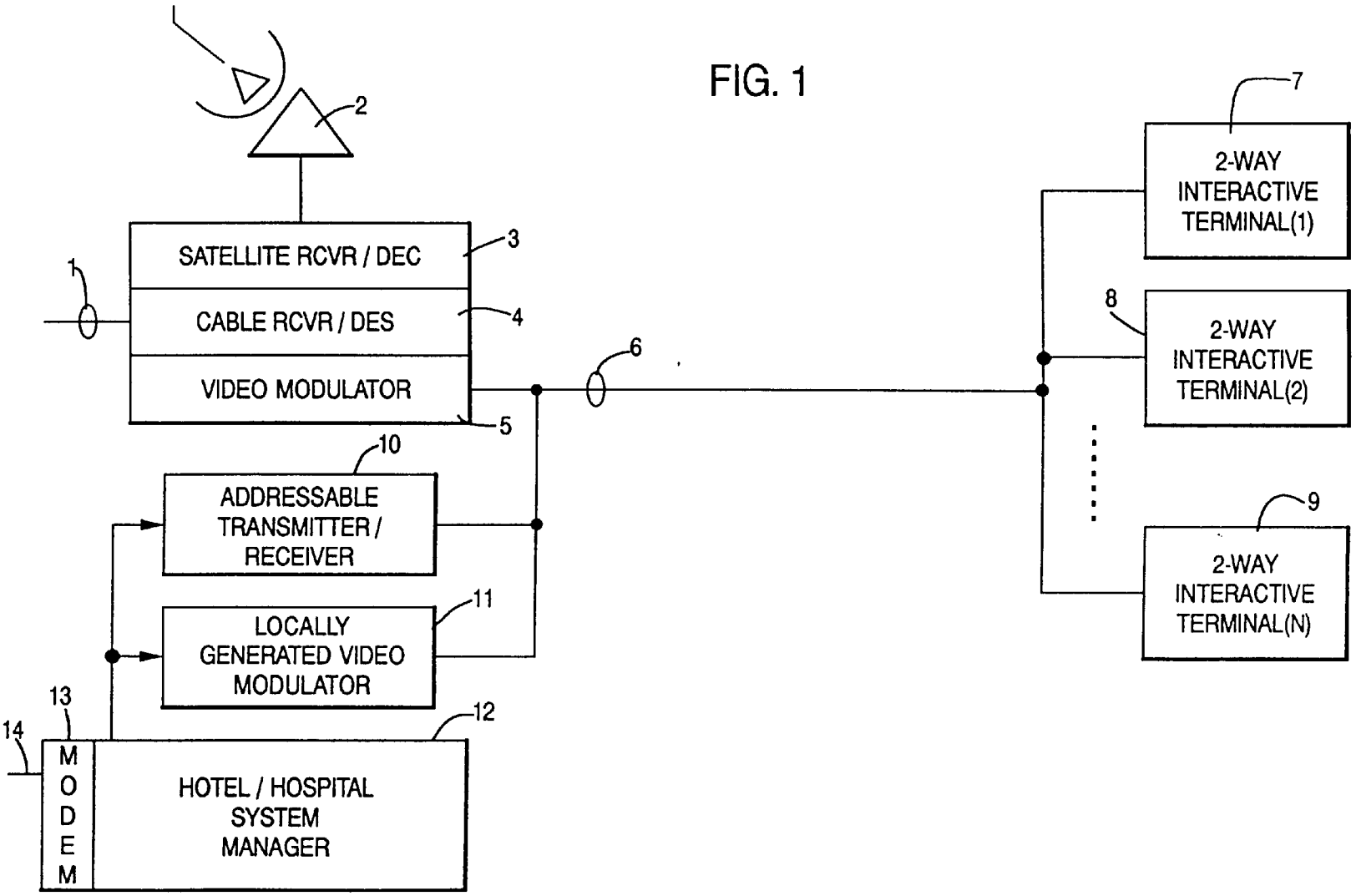
FIG. 1 is a block schematic diagram of an interactive entertainment system in accordance with the present invention applied in a hotel or hospital system environment comprising automatically configurable, 2-way interactive terminals.

Referring to FIG. 1, there is shown a block schematic diagram of an interactive entertainment system in accordance with the present invention. The depicted embodiment relates to its application in a hotel or hospital system environment; however, the present invention is not so limited. The present invention may also be applied in any two-way interactive entertainment system such as a cable or satellite television entertainment system involving a distribution network comprising trunk lines and feeder cables of optical or coaxial cable. For example, satellite receiver and decoder 3, cable receiver and descrambler 4, video modulator 5, addressable transmitter receiver 10, locally generated video modulator 11, and system manager 12 may all be located at the location of a cable television system head end. In this example, transmission link, 6 can be a coaxial cable or optical fiber link which connects the cable television head end to two-way interactive terminals 7, 8 or 9 of the entertainment system located at individual subscriber premises.

On the other hand, the embodiment of FIG. 1 is especially exemplary of the application of the present invention in a hotel or hospital entertainment system. Transmission link 6, then, may simply comprise a coaxial or optical fiber cable link between an entertainment control center and N terminals, for example, terminals 7, 8 or 9 located in rooms of the facility.

In particular, at the entertainment system control center, a satellite signal may be received at satellite antenna 2 and then received and decoded at satellite receiver decoder 3 for distribution via modulator 5 over a transmission link 6 to the interactive terminals 7, 8 or 9 of the present invention. Additionally, a band of cable television channels received over cable facilities 1 are received and, if necessary, descrambled at cable receiver/descrambler 4. The descrambled video signals are then modulate at modulator 5 for distribution over transmission link 6 to interactive terminals 7, 8 or 9. If desired, an optional scrambler may be provided for scrambling premium channel transmissions to interactive terminals 7, 8 or 9. Of course, terminal 7, 8, or 9, then, would comprise descrambler circuitry capable of descrambling the scrambled premium channel transmissions. Such circuitry is not shown in either FIGS. 1 or 2 but would be preferable in a system involving distribution of signals to remote subscriber locations.

According to the exemplary embodiment of FIG. 1, the hotel or hospital location may be connected to other hotels or hospitals via data link 14. Over data link 14, data may be received via modem 13 at system manager 12. In this manner, the hotel or hospital system manager may maintain current status of all features and all interactive terminals of an entertainment system comprising a plurality of hotels. For example, entertainment schedules may be distributed over the data transmission link from a network control center where the entertainment schedule is composed. System manager 12 comprises a data processing unit and appropriate memory for storing status and features associated with all terminals in the system. System manager 12 also controls the generation of video channels at modulator 11, if necessary, for transmission over transmission link 6 to the two-way interactive terminals 7, 8 or 9. In particular, modulator 11 comprises the capability to generate signals for actuating the display of character screens at terminal locations responsive to the control of the system manager 12 in the event, for example, the terminals are unable to generate the character screens themselves.

The generation of complete screens of characters for transmission to a terminal according to the present invention for display is not required because the terminal (FIG. 2) comprises its own character generator 204. Consequently, locally generated video modulator 11 is optional. Instead, system manager 12 generates commands to generate screens, and not the screens themselves, for transmission via addressable transmitter 10 to an interactive terminal according to the present invention. In a "hybrid" system comprising terminals having no character generator and terminals according to the present invention, locally generated video modulator 11 would be necessary. The screens generated either at the terminal or by way of modulator 11, for example, may relate to the provision of information to guests or patients about hotel or hospital services, respectively.

Also according to FIG. 1, system manager 12 controls an addressable transmitter/receiver 10 for transmitting addressed communications which are uniquely addressed to terminals 7, 8 or 9 and receiving communications at random times or in response to polling requests of terminals. The addressable transmitter 10 according to FIG. 1 may transmit addressed information on a separate data carrier, for example, at 108 megahertz and receive information transmitted in a so-called upstream direction from the terminals on another separate data channel at 25 megahertz. In an alternative embodiments, all downstream communications may be transmitted in band or within a particular television channel transmission, for example, within the horizontal or vertical intervals of transmitted video signals. Consequently, the system manager 12 accomplishes in band signaling by controlling data input into the video signals transmitted via either modulators 5 or 11 (not shown). A separate data carrier for each direction of transmission may be preferred due to the increased data carrying capacity. For upstream transmission, a telephone line or spread spectrum transmission may be employed as an alternative to a separate data channel.

Besides specifically addressed data communications with the interactive terminals 7, 8 or 9, the system manager may also address communications globally to all interactive terminals which communications may or may not require a terminal to respond. Such global communications, for example, may be addressed to a global address representing all terminals in the particular hotel system or to a group address representing a group of terminals within the system having a commonality of interest.

The problem solved by the present invention relates to the facilitation of the installation of a new interactive terminal 7, 8 or 9 into the system. According to the present invention, either the user of a terminal or an installer may install their terminal and so configure the terminal themselves. Interactive terminals 7, 8 or 9 are, consequently, equipped with means for enabling automatic installation according to FIG. 2.

Figure 2:
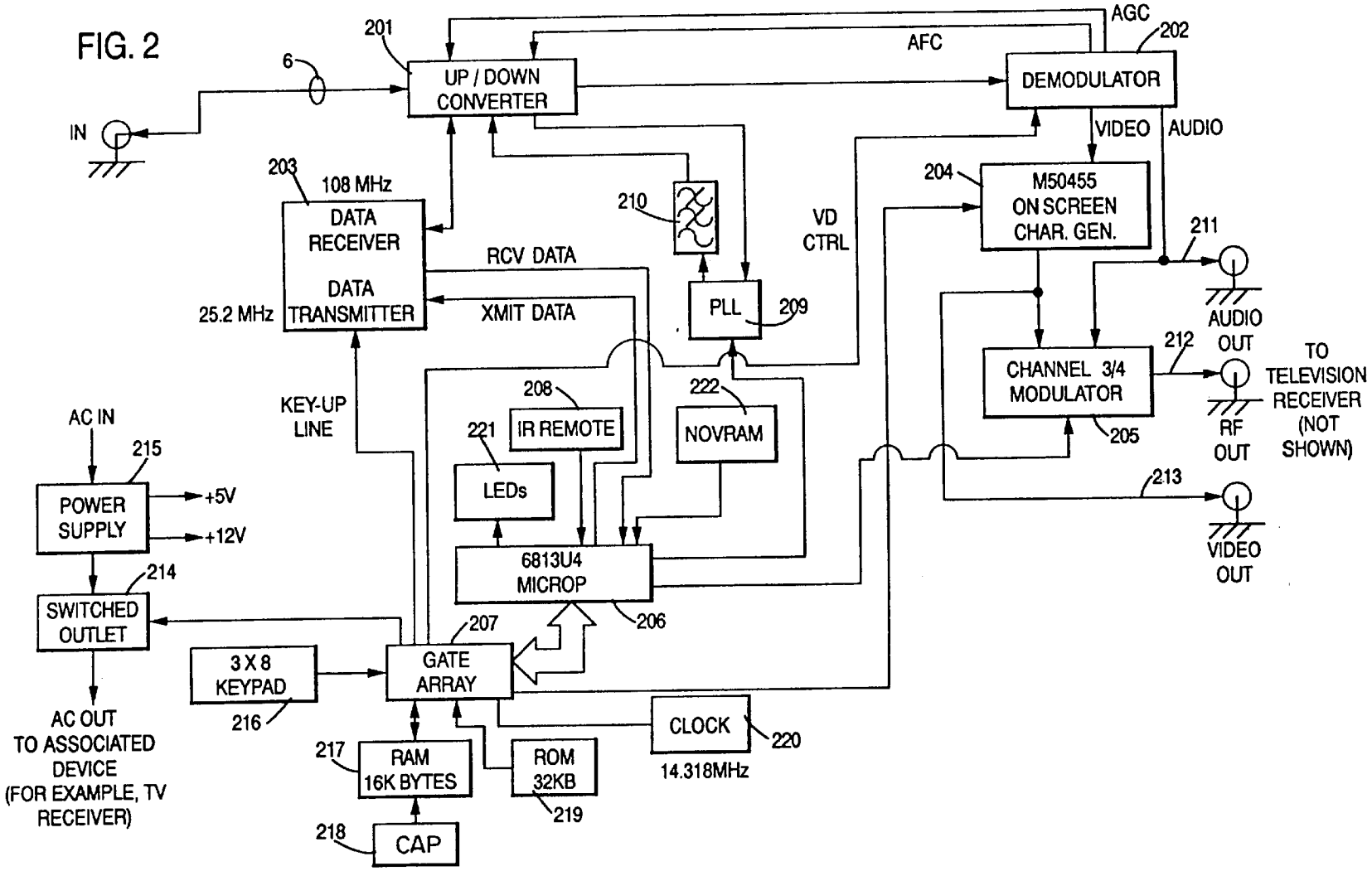
FIG. 2 is a block schematic diagram of a 2-way interactive terminal according to the present invention comprising a microprocessor, a memory, a character generator, a keypad and a television signal output to an associated television receiver.

Referring to FIG. 2, there is shown a two-way interactive terminal according to the present invention. The terminal is coupled via transmission link 6 to video modulator 5, addressable transmitter/receiver 10, and locally generated video modulator 11, if provided, as shown in FIG. 1.

In particular, a two-way interactive terminal according to the present invention comprises an up/down converter 201 for converting channels received over the transmission link 6 for display at an associated television receiver (not shown) or for transmitting data modulated to 25 megahertz by data transmitter 203 for transmission over transmission link 6. Up/down converter 201 passes data on the separate data carrier at 108 megahertz for demodulation and reception at data receiver 203. Received television entertainment signals are provided by up/down converter 201 to demodulator 202 which also provides automatic frequency control and gain control of up/down converter 201. Demodulator 202 provides video via on screen character generator 204 to channel 3/4 modulator 205. In this manner, on screen character generation may appear superimposed upon an incoming video signal or displayed in the form of a teletext screen, for example, text on a plain colored background. Also at demodulator 202 the baseband audio channel is transmitted to audio output 211 or via channel modulator 205 to the television receiver at radio frequency. In addition, a baseband video output 213 may be provided from on screen character generator 204 at video output jack 213.

The interactive terminal of the present invention further comprises a processor 206 for controlling data transmission and reception at data receiver/transmitter 203. Processor 206 also controls character generation at character generator 204 via gate array 207. Also via gate array 207, the processor 206 controls a key pad 216 which may be directly coupled to the gate array or coupled via infrared or other remote control transmission link receiver 208. Random access memory (RAM) 217, provided with backup power by capacitor 218, stores character screen commands, downloaded feature data and other data received over the data transmission link via data receiver 203 from the system manager responsive to processor 206 control. The processor 206 also has access to a nonvolatile random access memory 222 and access via gate array 207 to an outboard read only memory (ROM) 219. Processor 206 receives remote control key commands from a remote control key pad via infrared or other remote control transmission receiver 208. Processor 206 may also control the operation of a phase lock loop 209 and bandpass filter 210 for controlling operation of the up/down converter 201.

Power is supplied via an alternating current input to power supply 215 which provides, for example, a plus 5 volt and a plus 12 volt DC input to various components of the terminal requiring such power. Furthermore, the alternating current power input to power supply 215 may be provided via a controlled switched outlet 214 to an associated device such as the television receiver associated with the terminal. The state of the switched outlet 214 is controlled via gate array 207 by processor 206. For example, the switched outlet 214 may continuously provide power to its associated device or provide power only when an "on" button of key pad 216 or a remote control key pad is set to an on condition.

Values inside of boxes or associated with boxes are exemplary of memory sizes, clock rates, or component types. For example, clock 220 for clocking the microprocessor operation may operate at 14.318 megahertz. The clock signal is divided down by gate array 207 for operation of the microprocessor 206 which may be a Motorola MC 6803U4 or for clocking other processes of the terminal. The on screen character generator 204, for example, may be a Mitsubishi M50455 component. RAM 217 may comprise 16 kilobytes of memory and ROM 219 comprise 32 kilobytes of memory respectively.

In addition to character generation and screen display, LEDs 221 may, for example, indicate at least a power on condition or, additionally, an alternative display of tuned channel number or other data which may be displayed on a screen.

Referring now to FIGS. 3 and 4, the operation of the present terminal of FIG. 2 will be described especially in regard to the flowchart provided by FIG. 4. Copyright protection is asserted for each of screens FIGS. 3(a)–3(d) and for the flowchart of FIG. 4. Once the user of the terminal or an installer applies power to the power supply 215 of FIG. 2 and in accordance with application of power application box 401 of FIG. 4, processor 206 begins the task of initialization of various hardware components of the terminal of FIG. 2. Such hardware initialization routines according to box 402 of FIG. 4 may be any such initialization routines applied in the art of terminal initialization such as those applied in data terminal initialization. Processor 206 assures proper operation and communication and control of components of the terminal such as data transmitter and receiver 203, gate array 207, on screen character generator 204, key pad 216, and infrared remote control receiver 208. According to box 403, the software may perform self-inflicted diagnostic routines well known in the art to verify proper software operations. From box 403 the processor may enter an optional manufacturing or factory testing mode 403a which will be discussed subsequently. It may also enter a maintenance or display RAM mode of operation (FIG. 3(d)) represented by boxes 404–405 which will also be discussed subsequently, but which mode of operation is dependent on the particular depression of a predetermined key of keyboard 216 or the receipt of data entered via remote control receiver 208.

The present invention relates primarily to the actuation of a different predetermined key of key pad 216 or infra red remote control 208 within a predetermined period of time after the application of power at box 401. The predetermined period of time may be only the duration of reaching box 406 since power application and so appear to the user as if the application of power and display of a first installation mode screen are practically simultaneous, i.e., within a second or two of one another. The actuation of the "1" key, for example, is represented by box 406. If the one key has been depressed within a predetermined time after the application of power at box 401, a first display screen "1" is generated at box 407 via on screen character generator 204.

Display screen "1" relates to screen alignment test screen, FIG. 3(a). This display screen along with display screens, FIGS. 3(b) and 3(c), actuated via boxes 409 and 410, respectively, are stored in either read only memory of processor 206, read only memory 21 or nonvolatile RAM 222. Consequently, these screens are not dependent upon the system manager of FIG. 1 in any way. Also, because the entry into an installation mode is dependent on two normally unperformed tasks such as plugging in power and the practically simultaneous depression of a particular key, the installation mode is protected from inadvertent actuation.

Alternatively, box 406 may be supplemented by a decision box (not shown) asking if this is the first application of power. If yes, then box 407 is entered. If no, then a box such as existing box 406 requiring a "1" key depression is entered. Such an entry into the installation mode may facilitate installation without jeopardizing security as such a supplemental box would typically only be entered once in the life of a terminal.

Referring first to FIG. 3(a), there is shown a first display screen which comprises a test screen for an alignment of the display of an associated television receiver. As all television receivers do not handle the display of teletext screens in the same way, screen alignment is often necessary. According to FIG. 3(a), outer perimeter 301 represents the boundaries of a screen display of the associated television receiver. A box of asterisks 302 represents the boundaries of the test screen for testing alignment. A terminal user or installer follows the commands provided by test screen 302 to effectuate a proper screen alignment. Processor 206 may be scanning key pad 216 or receiving input commands entered via infrared remote receiver 208. Processor 206 will ignore any inputs besides those depicted in FIG. 3(a). For example, to align the screen display up or down, the user or installer will depress the channel increment or decrement key respectively. Furthermore, to align the screen display to the right or to the left, the user or installer will depress either the volume increase or decrease key respectively. To save the particular screen alignment selected, the user or installer depresses a "BUY" key and the next screen is displayed. Otherwise if the "NO" key is depressed before the "BUY" key, the previous screen alignment or default screen alignment setting will be saved. Actuating the "NO" key takes the user to the next screen shown in FIG. 3b. Step 408 of the flowchart of FIG. 4 represents screen alignment as described above whereby either a default or previously saved setting of screen alignment or a newly input screen alignment is saved in terminal memory. Optionally, a time out means may be provided whereby, if no action is taken, either the installation mode is quit or the next screen is displayed.

At box 409, a second screen of terminal configuration is displayed, screen 2. Screen 2 for terminal configuration is shown in FIG. 3(b). According to FIG. 3(b), a room name is requested as well as instructions from the user or installer as to whether the switched AC outlet 214 should be switched or placed in a permanently on condition. "Interlace:" is a request for input from the user or the installer as to whether teletext screens should be interlaced or non-interlaced. While non-interlaced is preferred, excessive screen bounce exhibited by the television receiver may require the display to be interlaced. However, non-interlaced screens generally exhibit little, if any, screen bounce compared with interlaced screen display.

The screen of FIG. 3(b) also may show the permanent unique identification number of the terminal, in this example, 123ABCO. If a user is to install a terminal and to secure the terminal's identity from piracy by the user of premium services, it may not be appropriate to display the unique terminal identification number. Also, in a user installation environment, the room name may be insufficient to uniquely identify the user's location and other information must be entered related to the location of the terminal. For example, in such a scenario, the user's name, address and credit information, i.e., credit card data, may be requested by this screen. Furthermore, the "interlace request" may require explanation to an unsophisticated user besides that provided by FIG. 3(b).

It should be noted that by assigning new functions to existing keys CH+, CH–, Vol+, Vol–, BUY, etc., the present invention permits programmable assignment of functions to keys which may have little or no relationship to the key labeling. Furthermore, by reinforcing the assigned key function by means of a screen display, a user or installer may feel comfortable with their selection of a particular key for performing a non-indicated function. In other words, the combination of screen display and programmable keys creates a human friendly interface between the user or the installer and the terminal.

Returning now to FIG. 3(b), "Room Name:" requests the entry of a non-zero room identifier. The system manager may be programmed to refuse acceptance of a room name comprising all zeros. Consequently, a terminal reporting a room name of all zeros will be denied entry into the system. The room name is entered by depressing numeric keys one at a time until the number is shifted into the seven indicated positions from right to left. Actuating the "BUY" key will save the displayed terminal configuration and actuate display of the next screen. Actuating the "NO" key will preserve the existing status and enter the next screen FIG. 3(c). If an invalid name has been entered, the "BUY" key will be ignored. A time out, if provided, will actuate the next screen or quit the installation mode.

Referring now to FIG. 3(c), a system manager, according to FIG. 1, may be in the process of polling a terminal, i.e. requesting or accepting transmissions from the terminal or configuring the terminal by transmitting, for example, channel assignments, screen generation commands, and/or features to the terminal for storage in memory. The "Sysmgr Status", then, is either "POLLING" or "CONFIGURING" when the system manager is active. If the system manager is down or is not communicating with the terminal for any reason, the "Sysmgr Status" is indicated as "INACTIVE." If either "POLLING" or "CONFIGURING" are displayed, the user or installer at least knows that the system manager is transmitting to the terminal.

The status of the terminal is either UNCONFIRMED or ACKNOWLEDGED. Typically, in a global command related to initial system entry, a system manager requests a newly installed terminal to transmit at least their identification and location name. If the system manager recognizes a previously unconfigured terminal or a new name not previously entered in the system, the system manager enters the new name into its memory along with configured features such as the status of the switched power outlet 214.

The third screen according to FIG. 3(c) is only to provide a visual indication to the user or the installer of system manager and terminal status. The processor 206 and system manager will interact, upon initial installation, regardless of whether the third screen is displayed until the terminal is entered into the system and the terminal entry is acknowledged if a valid room name or related data has been entered. The actuation of any keyboard key will quit the installation mode.

In an alternative embodiment, all three screens may comprise one screen provided the screen does not become too "busy" to be user friendly. For example, with the advent of high definition television and wider screens, it may be possible to condense the number of screens employed for an installation mode of terminal operation.

In an alternative embodiment, a time out may be associated with each screen such that, if no keys are depressed, the installation mode is eventually quit and no actions taken if no room name is entered.

Referring again to FIG. 4, at box 404, it may be possible to implement a "maintenance mode" of operation comprising boxes 404 and 405, for example, if desired, in a similar manner to the implementation of the "installation mode" of boxes 406–410. Instead of depressing the "1" key within a predetermined period of time, a "BUY" key actuation may be recognized within a predetermined period of time after the application of power and at some point after software initialization has at least begun at box 403. If the "BUY" key is depressed within a predetermined period of time since power application, a screen such as the screen of FIG. 3(d) may be displayed for showing memory status. One can page through the memory by depressing CH+ or CH− and may toggle from hexadecimal to ASCII format by depressing another key, for example, the "OK" key.

Furthermore, in a manner similar to that mode of access described by U.S. Pat. No. 4,792,972 which issued Dec. 20, 1988, and according to box 403a a factory testing or "mftr" mode of operation may be entered by entry of a special code via the infrared remote link receiver 208. In actuality, box 403a need not be located as shown as there is no required relationship between box 403a, initialization and the application of power. It may be entered at any time the special code is received, for example, during a normal mode of operation according to box 411. This special code, for example, may not be one that is generatable by either the terminal keypad 216 or an infrared transmitter normally provided with the terminal. In this way, only factory personnel may enter the factory mode unless, for example, an installer or user is provided with a special transmitter which can generate the special code.

Figure 5:
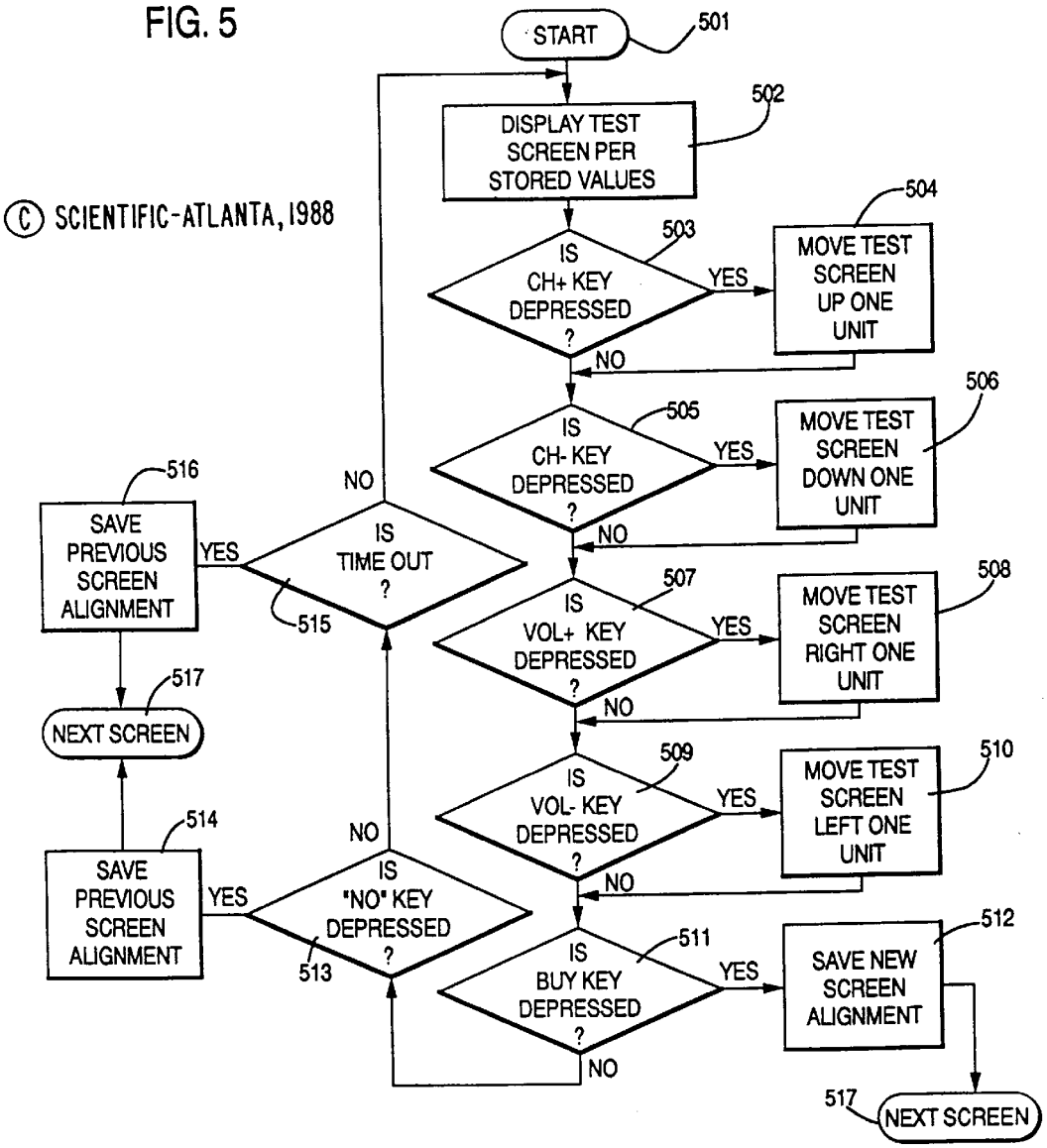
FIG. 5 is a detailed flowchart of processor operation related to screen alignment.
Figure 7:
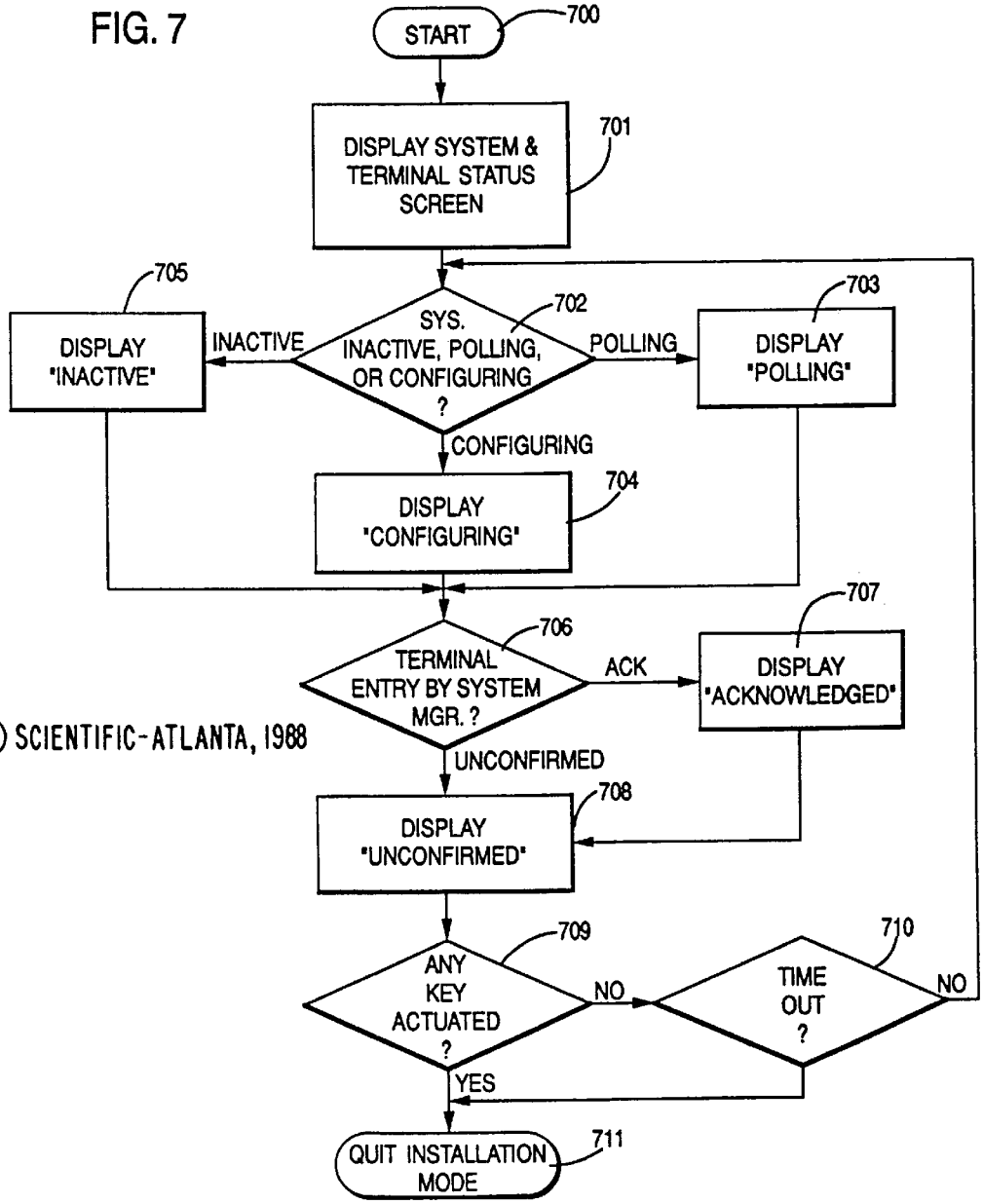
FIG. 7 is a detailed flowchart of processor operation related to system status and acknowledgement of system entry.

Referring now to FIGS. 5–7, the installation mode of operation of a terminal according to the present invention will be demonstrated in still greater detail. Copyright protection is asserted for each of flowcharts FIG.'S 5–7. FIG. 5 relates to steps 407 and 408 of FIG. 4 and test screen "1" of FIG. 3(a). Consequently, box 501 is entered from box 406 of FIG. 4 after a predetermined period of time has lapsed until the actuation of a "1" key measured by the duration of accomplishing initialization routines or directly after initialization if this is the first application of power to the terminal. Other means for accomplishing a predetermined period of time may include the use of clock 220 to obtain a predetermined count since power application. At box 502, test screen "1" is displayed in a position according to a default screen alignment position or a previously stored position. Boxes 503–510 relate to the incremental movement of the test screen by one unit, for example, one horizontal or vertical line, up or down, to the right or to the left.

If at box 511, the "buy" key is depressed, then, the new screen alignment is stored. If not, and the "No" key is actuated at box 513, the previous screen alignment is stored at box 514. Also, if a certain period of time has elapsed with no activity at box 515, the previous screen may be stored at box 516. The next screen, screen "2" of FIG. 3(b), is entered at box 517 having saved either the previous screen alignment or a newly entered screen alignment.

Referring now to FIG. 6, box 601 is entered from box 517 of FIG. 5. The screen according to FIG. 3(b) is displayed at box 602 and, optionally, so is the secret terminal identification number. Boxes 603–606 relate to configuring the status of the switched outlet 214 and to the interlaced or non-interlaced character of the display.

Any number key at box 607 will actuate a shifting to the left of numbers already entered in the room name field of FIG. 3(b). If a credit card number or other personal information is required of a user, then, another key may toggle to numeric entry of a credit card choice and then to a credit card number or to entry of any other number or item selection according to other screens (not shown). The depicted keyboard 216 is not equipped with alphabetic keys and comprises only eighteen or twenty-two keys of the required twenty-six. However, means are known for alphabetic entry of characters from a limited capacity keyboard which may be employed or the keyboard may be expanded by four keys if alphabetic input is required.

If a non-zero room name is entered at box 607, then, system entry can be obtained for a terminal via a path comprising boxes 609, 611, 612, 613 and 614. Otherwise, if the room name is invalid at box 611 and there has been no time out at box 610, the terminal will remain in a loop in which it will refuse to recognize a "BUY" key. If the "NO" key is actuated at box 609 or if there has occurred a time out at box 610, previously entered values are stored and the next screen extended at box 616. If, on the other hand, a valid room name has been entered at box 611 and the "BUY" key has been actuated at box 612, then the room name and the terminal configuration are stored at box 613 and the next screen entered at box 614.

Referring now to FIG. 7, screen 3 according to FIG. 3(c) is displayed showing the current status of the system manager and the terminal. Boxes 702–705 relate to display of the current status of the system manager. Boxes 706–708 relate to display of the current status of entry of the terminal into the system. Any key actuation at box 709 actuates a quitting of the installation mode at box 711 or a time out may be implemented according to box 710.

We claim:

1. A [two-way interactive] cable television entertainment terminal for communicating with a system manager of an entertainment system, the terminal comprising:

an analog transmission link for communicating via a radio frequency transmission media with the system manager, a processor for processing data, memory associated with the processor, a character generator, responsive to *a signal from* the processor, for generating characters for display on a display screen, a keypad for inputting information to the terminal, the input information for processing by the processor, a power input, the terminal, responsive to the application of power at the power input, entering an initialization [made] *mode*, the processor, during the initialization mode, verifying proper operation of terminal components and software, the terminal[, during initialization, entering] *further including circuitry which provides entry into* an [automatic] installation mode*, the installation mode being entered by switching on the terminal and actuating a predetermined key of the keypad, the installation mode including a mode for at least one of aligning a screen of characters and configuring the terminal for providing power to an associated device*, the character generator, responsive to *the signal from* the processor, for generating at least one display screen of characters [requiring keyboard] *requesting a keypad* response, the [required] *requested* response being related to [terminal] *the* installation *mode*, the terminal, recognizing an appropriate response, configuring itself according to the response prior to entry of the terminal into the entertainment system.

2. A terminal according to claim 1, [the at least one] *a first* display screen of characters generated by the character generator being related to alignment of a test screen on the display *screen* of an associated television receiver.

3. A terminal according to claim 1, [the at least one] *a first* display screen of characters generated by the character generator for requesting terminal location information input.

4. A terminal according to claim 1, [the at least one] *a first* display screen of characters generated by the character generator for requesting input as to [the] *an* interlaced or a non-interlaced character of the [character screen] display *screen*.

5. A terminal according to claim 1 further comprising a switched power output, the at least one display screen generated by the character generator for requesting input as to the provision of power to [an] *the* associated device.

6. A terminal according to claim 3 further comprising a second display screen of characters for indicating acknowledgement of terminal entry into the system by the system manager.

7. A terminal according to claim 1, a first display screen of characters generated by the character *generator* being related to alignment of a test screen on the display *screen* of an associated television receiver, a second display screen of characters for requesting terminal location information input and a third display screen of characters for indicating acknowledgement of terminal entry into the system by the system manager.

8. A terminal according to claim 1, the terminal, responsive to [the] *an* actuation of a [predetermined] *maintenance* key of the keypad, entering a maintenance mode, the character generator, responsive to [the] *a* recognition of the actuation of the [predetermined] *maintenance* key, for generating at least one display screen of characters related to the terminal maintenance mode.

9. A terminal according to claim 8, [the at least one] *a first* terminal maintenance mode display screen for displaying memory contents.

10. A terminal according to claim 9, the [at least one] *first* terminal maintenance mode display screen for displaying memory contents in hexadecimal format.

11. A terminal according to claim 9, the [at least one] *first* terminal maintenance mode display screen for displaying memory contents in ASCII format.

12. A terminal according to claim 9, the [at least one] *first* terminal maintenance mode display screen being adaptable for [the display of] *displaying* memory contents in a particular format.

13. A terminal according to claim 1, the keypad being [either for] *one of a* remote control [of the terminal or] *keypad and a* directly coupled [to] *keypad for controlling* the terminal.

14. A terminal according to claim 13, [the at least one] *a first* display screen of characters generated by the character generator being related to terminal testing during manufacture.

15. A terminal according to claim 14 comprising a remote control command receiver, the processor recognizing [the] *an* actuation of at least one [predetermined] *testing* key, the key being one not normally provided on [either] the remote control keypad [or] *and not normally provided on* the directly coupled keypad for transmitting a predetermined control code to the remote control command receiver of the terminal, the predetermined control code being related to terminal testing during manufacture.

16. A two-way interactive cable television entertainment terminal comprising a data processor, a memory associated with the data processor, a keypad for inputting data to the data processor, and a character generator, responsive to the data processor, for generating characters for display on a display screen, the terminal, responsive to the application of power to the terminal, entering an initialization mode, during which mode, the microprocessor, responsive to the actuation of at least one predetermined key, controlling the character generator for generating more than one display screen related to screen alignment, terminal configuration and verification of entry into an entertainment system.

[17. A terminal according to claim 16, the keypad comprising keys having programmable functions such that the keys have different functions depending on processor status, a present key function being displayed on the at least one display screen.]

18. In a [two-way interactive] cable television entertainment terminal comprising a data processor, a memory associated with the data processor, a keypad for inputting data to the data processor, and a character generator, responsive to *a signal from* the data processor, for generating characters for display on a display screen, a method of enabling an [automatic] installation of the terminal for entry into an entertainment system comprising the steps of:

applying power to the terminal, initializing operation of terminal components responsive to the application of power to the terminal, actuating a display of at least one screen of characters, the display screen [requiring] *requesting a* keypad response, recognizing an appropriate keypad response to the display screen, and configuring the terminal according to the response prior to entry of the terminal into the entertainment system,

*the installation of the terminal including one of aligning a screen of characters and configuring the terminal for providing power to an associated device.*

19. [An automatic] *A* terminal installation method according to claim 18, comprising the additional [step] *steps* of:

recognizing [the] *an* actuation of a predetermined key of the keypad during initialization within a predetermined period of time from the application of power to the terminal*; and*

*enabling the installation of the terminal when actuation of the predetermined key is recognized.*

20. [An automatic] *A* terminal installation method according to claim 18, the method comprising the additional steps of*:* recognizing an actuation of a [different] predetermined key*;* and quitting [automatic terminal] *the* installation [responsive to recognizing] *of the terminal when* the actuation of the [different] predetermined key *is recognized.*

21. [An automatic] *A* terminal installation method according to claim 18 further comprising the step of:

providing an indication of acknowledgement of entry of the terminal into the system.

22. [An automatic] *A* terminal installation method according to claim 18 wherein the [keyboard] *keypad* response may comprise a plurality of responses including at least [the] *an* entry of information related to terminal location.

23. [An automatic] *A* terminal installation method according to claim 21 wherein the acknowledgment indication is conditional upon [the] *an* entry of valid information via the keypad.

24. [An automatic] *A* terminal installation method according to claim 23 wherein the keypad entered information relates to terminal location.

25. [A two-way interactive] *A* entertainment terminal for communicating with a system manager of an entertainment system, the terminal comprising:

a transmission link for communicating via a media with the system manager, a processor for processing data, memory associated with the processor, a character generator, responsive to *a signal from* the processor, for generating characters for display on a display screen, a keypad for inputting information to the terminal, the input information for processing by the processor, a power input, a switched power output, the terminal, responsive to the application of power at the power input, entering an initialization mode, the processor, during the initialization mode, verifying proper operation of terminal components and software, the terminal[, during the initialization mode], *after the application of power and responsive to an actuation of at least one predetermined key of the keypad,* entering an [automatic] installation mode, the character generator, responsive to *the signal from* the processor, for generating at least one display screen of characters [requiring keyboard] *requesting a keypad* response, the [required] *requested* response being related to [terminal] *the* installation *mode*, the terminal, recognizing an appropriate response, configuring itself according to the response prior to entry of the terminal into the entertainment system, the at least one display screen of characters generated by the character generator further includes a screen of characters for requesting input as to the provision of power to an associated device.

26. A [two-way interactive] cable television entertainment terminal for communicating with a system manager of an entertainment system, the terminal comprising:

an analog transmission link for communicating via a radio frequency transmission media with the system manager, a processor for processing data, memory associated with the processor, a character generator, responsive to *a signal from* the processor, for generating characters for display on a display screen, a keypad for inputting information to the terminal, the input information for processing by the processor, a power input, the terminal, responsive to the application of power at the power input, entering an initialization [made] *mode*, the processor, during the initialization mode, verifying proper operation of terminal components and software, the terminal, [during initialization] *after application of power and responsive to an actuation of at least one predetermined key of the keypad*, entering an [automatic] installation mode, the character generator, responsive to *the signal from* the processor, for generating at least one display screen of characters [requiring keyboard] *requesting a keypad* response, the [required] *requested* response being related to [terminal] *the* installation *mode*, the terminal, recognizing an appropriate response, configuring itself according to the response prior to entry of the terminal into the entertainment system, the at least one display screen of characters comprising a first screen generated by the character generator for requesting *at least one of* terminal location information input [or] *and* terminal identification information input, the at least one display screen of characters comprising a second screen for indicating acknowledgement of terminal entry into the system by the system manager after input of *at least one of* terminal identification [or] *and* location information.

27. [A two-way interactive] *An* entertainment terminal for communicating with a system manager of an entertainment system, the terminal comprising:

a transmission link for communicating via a media with the system manager, a processor for processing data, memory associated with the processor, a character generator, responsive to *a signal from* the processor, for generating characters for display on a display screen, a keypad for inputting information to the terminal, the input information for processing by the processor, a power input, a remote control command receiver[,] *for receiving* a predetermined control code, the terminal, responsive to the application of power at the power input, entering an initialization mode, the processor, during the initialization mode, verifying proper operation of terminal components and software, the terminal, [during the initialization mode] *after application of power and responsive to an actuation of at least one predetermined key of the keypad*, entering an [automatic] installation mode, the character generator, responsive to *the signal from* the processor, for generating at least one display screen of characters [requiring keyboard] *requesting a keypad* response, the [required] *requested* response being related to [terminal] *the* installation *mode*, the terminal, recognizing an appropriate response, configuring itself according to the response prior to entry of the terminal into the entertainment system,

[the at least one] *a first* display screen of characters generated by the character generator being related to terminal testing during manufacture, the [keyboard] *keypad* being [either for] *one of a* remote control [of the terminal or] *keypad and a* directly coupled [to] *keypad for controlling* the terminal, the processor recognizing [the] *an* actuation of at least one [predetermined] *testing* key, said one [predetermined] *testing* key being one not normally provided on [either] the remote control keypad [or] *and not normally provided on* the directly coupled keypad for transmitting [a] *the* predetermined control code to the remote control command receiver of the terminal, the predetermined control code being related to terminal testing during manufacture.

*28. A cable television terminal for communicating with a system manager of an entertainment system, the terminal comprising:*

*a power switch;*

*circuitry providing entry into a mode for configuring the power switch to provide power to an associated device; and*

*means for generating at least one menu screen of characters while the terminal is operating in the mode for configuring, the at least one menu screen providing a cue to aid selection of a configuration of the power switch.*

*29. A cable television terminal for communicating with a system manager of an entertainment system, the terminal comprising:*

*circuitry capable of generating a screen of characters;*

*circuitry providing entry into a mode for aligning the screen of characters on a display of an associated device; and*

*means for generating a menu screen of characters while the terminal is operating in the mode for aligning.*

*30. The cable television terminal of claim 29, wherein the menu screen provides a cue to aid alignment of the screen of characters, the cue including at least one of move up, move down, move left and move right.*

*31. A cable television terminal for communicating with a system manager of an entertainment system, the terminal comprising:*

*circuitry providing entry into a terminal installation mode; and*

*means for generating at least one screen of characters while the terminal is operating in the terminal installation mode,*

*the terminal installation mode including a mode for at least one of aligning a first screen of characters and configuring a power switch.*

*32. The cable television terminal of claim 31, wherein the circuitry providing entry includes a remote control device operated by a user.*

*33. The cable television terminal of claim 31 further comprising means for aligning the first screen of characters on a display of an associated device while the terminal is operating in the terminal installation mode.*

*34. The cable television terminal of claim 31 further comprising means for at least one of selecting and displaying a configuration of the power switch for providing power to an associated device while the terminal is operating in the terminal installation mode.*

*35. The cable television terminal of claim 31 further comprising means for controlling an operation of the terminal while the terminal is operating in the terminal installation mode, the means for controlling including a remote control device operated by a user.*

*36. The cable television terminal of claim 35, wherein the operation of the terminal includes aligning the first screen of characters on a display of an associated device.*

*37. The cable television terminal of claim 35, wherein the operation of the terminal includes selecting a configuration of the power switch for providing power for an associated device.*

*38. The cable television terminal of claim 35, wherein the operation of the terminal includes displaying a configuration of the power switch for providing power to an associated device.*

*39. A two-way interactive cable television entertainment terminal comprising a data processor, a memory associated with the data processor, a keypad for inputting data to the data processor, and a character generator, responsive to a signal from the data processor, for generating characters for display on a display screen, the terminal, responsive to the application of power to the terminal, entering an initialization mode, during which mode, the microprocessor, responsive to the actuation of at least one predetermined key, controlling the character generator for generating more than one display screen related to screen alignment, terminal configuration and verification of entry into an entertainment system.*

*40. In a two-way interactive cable television entertainment terminal comprising a data processor, a memory associated with the data processor, a keypad for inputting data to the data processor, and a character generator, responsive to a signal from the data processor for generating characters for display on a display screen, a method of*

*enabling an automatic installation of the terminal for entry into an entertainment system comprising the steps of:*

*applying power to the terminal,*

*initializing operation of terminal components responsive to the application of power to the terminal,*

*actuating a display of at least one screen of characters, the display screen requiring keypad response,*

*recognizing an appropriate keypad response to the display screen, and*

*configuring the terminal according to the response prior to entry of the terminal into the entertainment system.*

*41. A cable television entertainment terminal comprising a data processor, a memory associated with the data processor, a keypad for inputting data to the data processor, and a character generator, responsive to a signal from the data processor, for generating characters for display on a display device, the terminal, responsive to the application of power to the terminal and an actuation of at least one predetermined key, controlling the character generator to generate more than one display screen related to at least one of screen alignment and terminal power output configuration.*

*42. A cable television entertainment terminal comprising a power on switch, a keypad for inputting data, a character generator for generating at least one display screen for display on a display device, and circuitry, responsive to an actuation of the power on switch and at least one predetermined key, for controlling the character generator to generate more than one display screen of a plurality of screen displays related to at least one of screen alignment and terminal power output configuration.*

*43. In a cable television terminal for communicating with a system manager of an entertainment system, a method for enabling installation of the terminal comprising steps of:*

*entering into a mode for configuring a power switch in the terminal to provide power to an associated device; and*

*generating at least one menu screen of characters while the terminal is operating in the mode for configuring, the at least one menu screen providing a cue to aid selection of a configuration of the power switch.*

*44. In a cable television terminal for communicating with a system manager of an entertainment system, a method for enabling installation of the terminal comprising steps of:*

*entering into a mode for aligning a screen of characters on a display of an associated device; and*

*generating at least one menu screen of characters while the terminal is operating in the mode for aligning.*

*45. The method of claim 44, wherein a first menu screen provides a cue to aid alignment of the screen of characters, the cue including at least one of move up, move down, move left and move right.*

*46. In a cable television terminal for communicating with a system manager of an entertainment system, a method for enabling installation of the terminal comprising steps of:*

*entering into a terminal installation mode; and*

*generating at least one screen of characters while the terminal is operating in the terminal installation mode,*

*the terminal installation mode including a mode for at least one of aligning a first screen of characters and configuring a power switch.*

*47. The method of claim 46, wherein the step of entering includes operating a remote control device by a user.*

*48. The method of claim 46 further comprising a step of aligning the first screen of characters on a display of an associated device while the terminal is operating in the terminal installation mode.*

*49. The method of claim 46 further comprising a step of at least one of selecting and displaying a configuration of the power switch for providing power to an associated device while the terminal is operating in the terminal installation mode.*

*50. The method of claim 46 further comprising a step of controlling an operation of the terminal while the terminal is operating in the terminal installation mode, the step of controlling including operating a remote control device by a user.*

*51. The method of claim 50, wherein the step of controlling an operation of the terminal includes aligning the first screen of characters on a display of an associated device.*

*52. The method of claim 50, wherein the step of controlling an operation of the terminal includes selecting a configuration of the power switch for providing power for an associated device.*

*53. The method of claim 50, wherein the step of controlling an operation of the terminal includes displaying a configuration of the power switch for providing power to an associated device.*

*54. In a cable television entertainment terminal, a method of enabling an installation of the terminal comprising steps of:*

*applying power to the terminal,*

*actuating a display of at least one screen of characters, a first display screen requesting a keypad response,*

*recognizing an appropriate keypad response to the first display screen, and*

*configuring the terminal according to the keypad response,*

*the installation of the terminal including one of aligning a screen of characters and configuring the terminal for providing power to an associated device.*

*55. The method according to claim 54, comprising additional steps of:*

*recognizing an actuation of a predetermined key during the application of power to the terminal; and*

*enabling the installation of the terminal when actuation of the predetermined key is recognized.*

*56. The method to claim 54, comprising additional steps of:*

*recognizing an actuation of a predetermined key; and*

*quitting the installation of the terminal when the actuation of the predetermined key is recognized.*

*57. A cable television entertainment terminal for communicating with a system manager of an entertainment system, the terminal comprising:*

*a keypad for inputting information into the terminal,*

*a power input,*

*circuitry providing entry into an installation mode, the installation mode being entered by switching on power to the terminal and actuating a predetermined key of the keypad, the installation mode including a mode for at least one of aligning a screen of characters and configuring the terminal for providing power to an associated power using device,*

*a character generator for generating at least one display screen of characters requesting a keypad response while operating in the installation mode, the requested keypad response being related to the installation mode, and*

*means for installing the terminal according to the keypad response.*

*58. A terminal according to claim 57, a first display screen of characters generated with the character generator being*

*related to alignment of a test screen on a display of an associated display device.*

*59. A terminal according to claim 57 further comprising a switched power output, a first display screen generated with the character generator being for requesting an input to configure the terminal for providing power to the associated power using device.*

*60. An interactive entertainment terminal for communicating with a system manager of an entertainment system, the terminal comprising:*

*transmission means for communicating with the system manager,*

*a keypad for inputting information to the terminal,*

*a power input,*

*a switched power output,*

*circuitry providing entry into an installation mode, the installation mode being entered by switching on power to the terminal and actuating a predetermined key of the keypad,*

*a character generator for generating at least one display screen of characters, a first display screen requesting a keypad response while operating in the installation mode, the requested keypad response being related to the installation mode, and*

*means for configuring the terminal according to the keypad response,*

*the first display screen including a screen of characters for requesting an input to configure the terminal for providing power to an associated device.*

*61. A two-way interactive cable television entertainment terminal for communicating with a system manager of an entertainment system, the terminal comprising:*

*an analog transmission link for communicating via a radio frequency transmission media with the system manager,*

*a processor for processing data,*

*memory associated with the processor,*

*a character generator, responsive to a signal from the processor, for generating characters for display on a display screen,*

*a keypad for inputting information to the terminal, the input information for processing by the processor,*

*a power input,*

*the terminal, responsive to the application of power at the power input, entering an initialization mode,*

*the processor, during the initialization mode, verifying proper operation of terminal components and software,*

*the terminal, during initialization, entering an automatic installation mode,*

*the character generator, responsive to the signal from the processor, for generating at least one display screen of characters requiring keypad response, the required response being related to terminal installation,*

*the terminal, recognizing an appropriate response, configuring itself according to the response prior to entry of the terminal into the entertainment system.*

* * * * *